United States Patent [19]

Osawa

[11] Patent Number: 4,988,215
[45] Date of Patent: Jan. 29, 1991

[54] LINEAR GUIDE APPARATUS USING A COMBINATION OF BALLS AND ROLLERS

[75] Inventor: Nobuyuki Osawa, Takasaki, Japan

[73] Assignee: Nippon Seiko Kabushiki Kaisha, Tokyo, Japan

[21] Appl. No.: 516,242

[22] Filed: Apr. 30, 1990

[30] Foreign Application Priority Data

May 1, 1989 [JP] Japan .................. 59-112605

[51] Int. Cl.$^5$ .............................. F16C 29/06
[52] U.S. Cl. ........................... 384/44; 384/45
[58] Field of Search .............. 384/44, 45, 43; 464/168

[56] References Cited

U.S. PATENT DOCUMENTS 4,886,376 12/1989 Osawa ............................ 384/45
4,902,143 2/1990 Morita ........................... 384/44

FOREIGN PATENT DOCUMENTS 61-168328 10/1986 Japan .

Primary Examiner—Lenard A. Footland
Attorney, Agent, or Firm—Basile and Hanlon

[57] ABSTRACT

A guide rail of a linear guide apparatus has a pair of roller raceway surfaces extending axially and formed in boundary edges between an upper surface and both lateral side surfaces by chamfering the boundary edges at a slant angle of 45°. A slider main body having an U-shaped cross section and straddling the guide rail movably is provided with a pair of roller rolling grooves formed in both inner corners respectively corresponding to the roller raceway surfaces of the guide rail. The rollers inserted in the roller rolling grooves have a chamfered surface inclined at an angle of 45° formed by chamfering an inner or upward boundary edge between an inner end face and an outer peripheral surface. A roller retainer having a rectangular frame shape is disposed in a space between an inner surface of the slider main body and the upper surface of the guide rail by being supported at axial opposite ends thereof by end caps which are secured to opposite axial ends of the slider main body. Both longitudinal legs of the frame-shaped roller retainer have roller retaining surfaces formed in both outer side surfaces of the longitudinal legs.

4 Claims, 5 Drawing Sheets

LINEAR GUIDE APPARATUS USING A COMBINATION OF BALLS AND ROLLERS

BACKGROUND OF THE INVENTION

1. Field of the Invention

The present invention relates to a linear guide apparatus using a combination of balls and rollers as rolling members which are interposed between a guide rail and a slider travelling on the guide rail.

2. Description of the Prior Art

A prior art linear guide apparatus of this type is disclosed, for example, in Japanese Utility Model Laid-Open Publication No. 61-158324.

In this linear guide apparatus, as shown in FIG. 13, a multiplicity of balls 3 and rollers 4 are interposed as rolling members between a guide rail 1 and a slider 2 which is mounted straddling the guide rail 1. The balls 3 move while rolling within ball rolling grooves 5 opposing to each other formed in both side surfaces of the guide rail 1 and formed in both inner surfaces of the slider 2 as the slider 2 travels, and the balls 3 infinitely circulate through circulating paths 6. The rollers 4 move while rolling between an upper surface 1a of the guide rail 1 and an opposing inner surface 2a of the slider 2 and circulate infinitely through a circulating path 7.

In this manner, by using not only the balls but the roller train exhibiting high rigidity as the rolling members of the linear guide apparatus, the linear guide apparatus is allowed to provide a high load bearing capacity.

However, in the prior art linear guide apparatus using a combination of balls and rollers, since it is structured that the rollers 4 move while rolling on the upper surface 1a of the guide rail 1, the following drawbacks are involved.

(1) When the load which is loaded on the slider 2 is not a vertical load, since the rollers 4 can support only a vertical load, the balls 3 which are disposed in the lateral sides are loaded with undue load, and the load bearing capacity is reduced.

(2) When the slider 2 is removed from the guide rail 1, the rollers 4 will fall off the slider 2.

(3) Since a bolt hole 9 for fixing the guide rail 1 is bored in the guide rail 1, a uniform raceway can not be formed without securing a receway track 11 on the upper surface. However, it is impossible to secure the raceway track 11 on the upper surface of the guide rail 1 until the guide rail 1 has been fixed.

SUMMARY OF THE INVENTION

It is an object of the present invention to solve the above problems by providing a linear guide apparatus using a combination of balls and rollers, which is capable of exhibiting sufficient rigidity against a load other than a vertical load, and which includes a roller retainer enabling to retain the rollers in the slider.

In order to achieve the above object, a linear guide apparatus according to the invention comprises a guide rail extending axially and having a pair of axial roller raceway surfaces respectively formed in boundary edges between an upper surface and both lateral side surfaces and a pair of axial ball rolling grooves respectively formed in both the lateral side surfaces in parallel with the roller raceway surfaces, a slider main body straddling the guide rail movably in the axial direction and having a pair of roller rolling grooves respectively opposing to the roller raceway surfaces and a pair of ball rolling grooves respectively opposing to the ball rolling grooves of the guide rail, the slider main body further having ball return paths formed penetrating axially respectively in parallel with the ball rolling grooves and having roller return paths formed penetrating axially respectively in parallel with the roller rolling grooves, end caps respectively joined to opposite ends of the slider main body, each of the end caps having a pair of curved paths each communicating corresponding ones of the ball return path and the ball rolling groove, and having a pair of curved paths each communicating corresponding ones of the roller return path and the roller rolling groove, a multiplicity of balls inserted in the opposing ball rolling grooves of the slider main body and the guide rail and in the ball return paths and in the curved paths so as to move and circulate therethrough while rolling, and a multiplicity of rollers inserted in the roller rolling grooves, the roller return paths, and the curved paths so as to move and circulate therethrough while rolling. A roller retainer is provided to retain the rollers in the roller rolling grooves of the slider main body, and the roller retainer has a rectangular frame shape, and roller retaining surfaces are formed on outer side surfaces of longitudinal legs. The roller retainer is further provided with holding and supporting sections which are protruding axially and outwardly from lateral legs, and the roller retainer is disposed in a space between the upper surface of the guide rail and an inner surface of the slider main body opposing thereto by being held and supported by the end caps with the holding supporting sections fitted into supporting holes respectively formed in the end caps. The roller retainer retains the rollers in the roller rolling grooves with the roller retaining surfaces of the longitudinal legs abutting against chamfered surfaces of the rollers.

Furthermore, each of the roller return paths may be formed by a cylindrical hole penetrating through the slider main body axially and by incerting into the cylindrical hole a roller circulating tube having square through hole at the center along the axis.

Furthermore, the roller circulating tube may be formed with positioning protrusions protruding from opposite ends axially, and the end caps may be formed with positioning holes for allowing the positioning protrusions being fitted thereinto.

Moreover, the roller circulating tube may be formed with a fitting adjusting ridge on the outer surface extending axially.

In the linear guide apparatus structured as described above, the pair of roller raceway surfaces are formed on the guide rail by chamfering the boundary edges between the upper surface and both the side surfaces, and the rollers roll on the roller raceway surfaces in an inclined attitude. As a result, even when the load on the slider is a vertical load or a lateral load, either of the loads can be supported by the rollers, and the load bearing capacity is increased significantly.

Furthermore, since one end surface of the roller is chamfered to a great extent and the chamfered surface of the roller is supported by the roller retainer to retain the roller in the roller rolling groove, the roller does not fall off the roller rolling groove even when the slider is removed from the guide rail.

DESCRIPTION OF THE PREFERRED EMBODIMENTS

The embodiment of the invention will be described with reference to the drawings.

FIGS. 1 to 12 show an embodiment of the invention.

Figure 1:
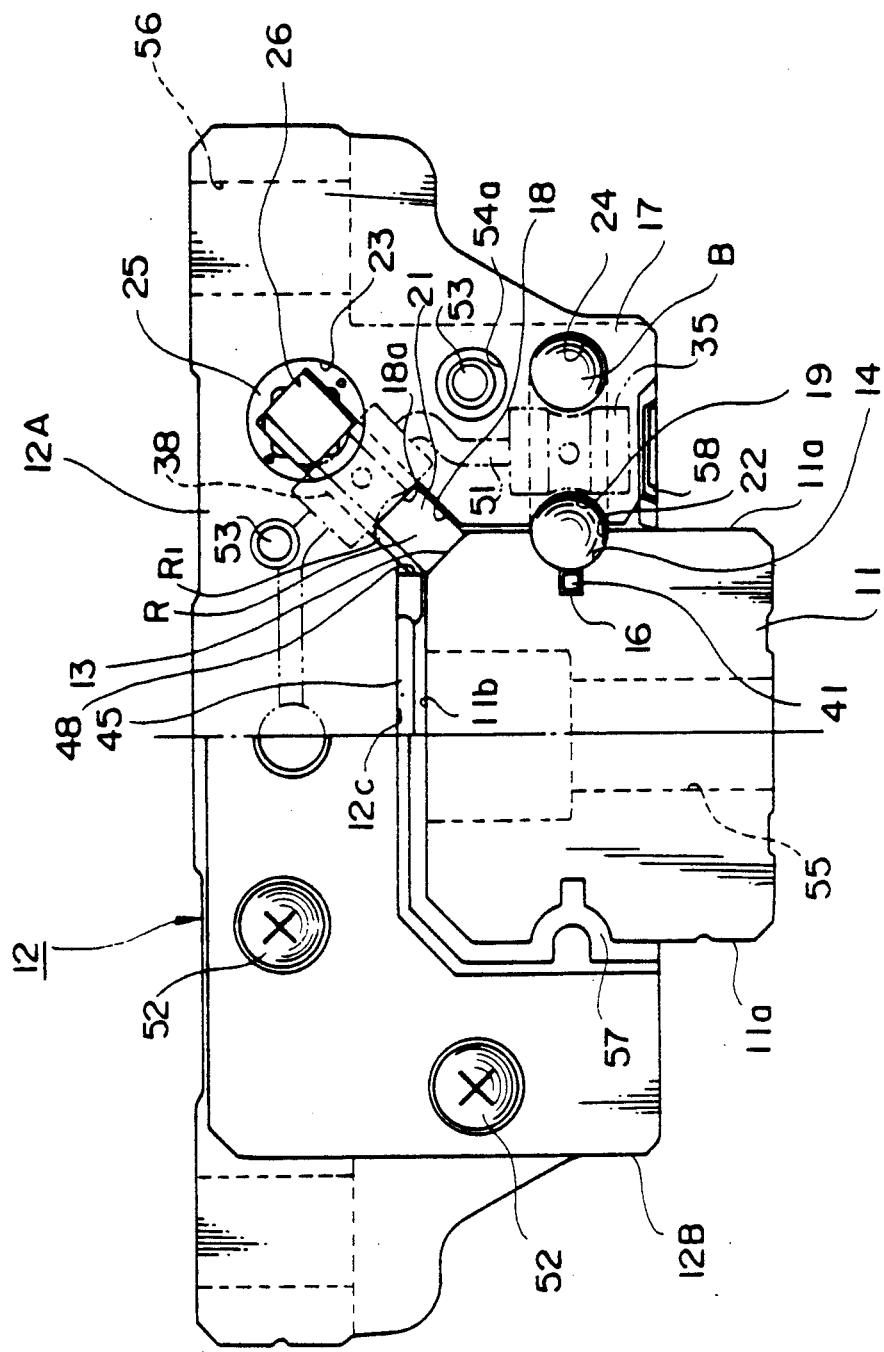
FIG. 1 is a front view of a linear guide apparatus of an embodiment of the present invention with a half of an end cap is cut out.
Figure 2:
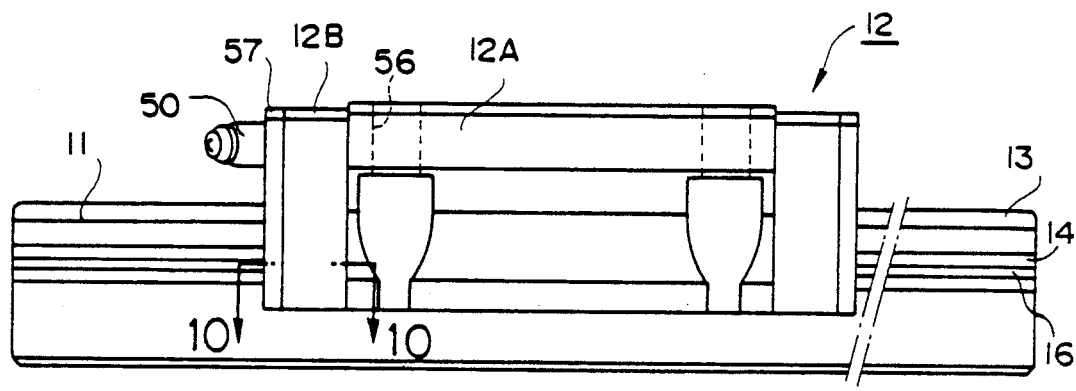
FIG. 2 is a side view of the linear guide apparatus of FIG. 1.
Figure 3:
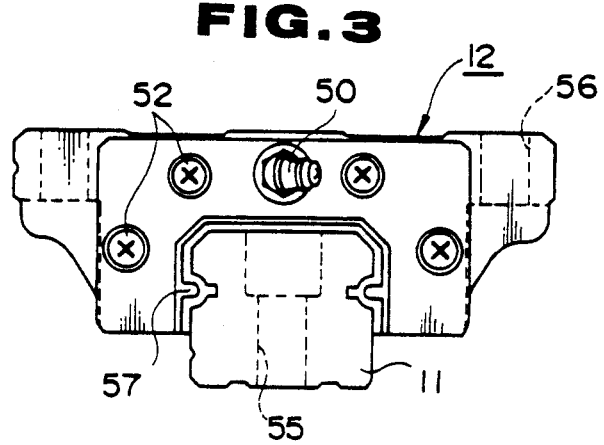
FIG. 3 is a front view of the linear guide apparatus of FIG. 1.

With reference to FIGS. 1 to 3, a slider 12 having an inverted U-shaped cross section is mounted straddling on a guide rail 11 having a square cross section so that the slider 12 is movable in an axial direction relative to the guide rail 12. The slider 12 has end caps 12B respectively secured removably to axial opposite ends of a slider main body 12A. Boundary edges between an upper surface 11b and both side surfaces 11a and 11a are chamfered at an angle of 45° respectively to form roller raceway surfaces 13 extending axially. Furthermore, the guide rail 11 has ball rolling grooves 14 having a semicircular cross section and extending axially formed in both the side surfaces 11a and 11a at intermediate positions between the upper surface and a bottom surface of the guide rail 11.

Each of the ball rolling grooves 14 has a recess 16 formed at a bottom surface along the axial direction to accommodate a ball retainer 41 to prevent balls E from falling off the slider 12 when the slider in removed from the guide rail 11. The ball retainer 41 will be described in detail later.

Figure 4:
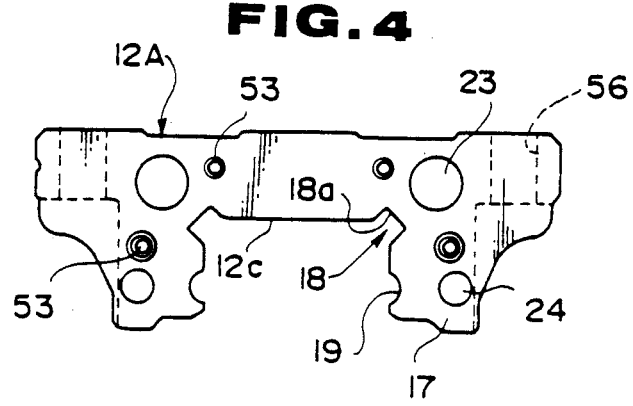
FIG. 4 is a front view of the slider main body.

On the other hand, as shown in FIG. 4, roller rolling grooves 18 having a square cross section are formed respectively at inner corners of both side walls 17 of the slider main body 12A so that the roller rolling grooves 18 respectively oppose to the roller raceway surfaces 13 of the guide rail 11. Further, ball rolling grooves 19 having a semicircular cross section are respectively formed in inner surfaces of both the side walls 17 so that the ball rolling grooves 19 oppose to the ball rolling grooves 14 of the guide rail 11.

The roller raceway surface 13 of the guide rail 11 and the roller rolling groove 18 of the slider main body 12A constitute a roller rolling path 21. Also, the ball rolling groove 14 of the guide rail 11 and the ball rolling groove 19 of the slider main body 12A constitute a ball rolling path 22.

A pair of cylindrical through holes 23 are formed in thick wall portions of the slider main body 12A. Each of the cylindrical through holes 23 is formed at a position in an oblique and upward direction at an angle of 45° from the roller rolling path 21 with respect to the horizontal plane. The cylindrical through hole 23 extends axially in parallel with the roller rolling path 21. Also, a ball return path 24 made up of an axial through hole having a circular cross section is formed in a thick wall portion of each side wall 17 so that the ball return path 24 is in parallel with the ball rolling path 22.

Figure 5:
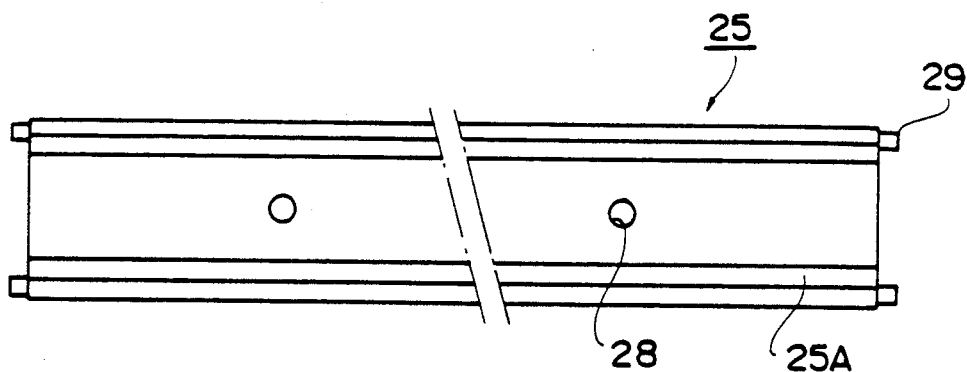
FIG. 5 is a side view of the roller circulating
Figure 6:
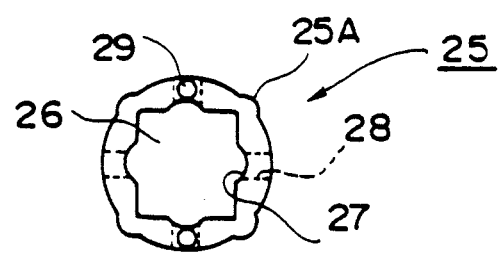
FIG. 6 is a front view of the roller circulating tube of FIG. 5.

A roller circulating tube 25 having a hollow cylindrical shape as shown in FIGS. 5 and 6 is fitted into the cylindrical through hole 23. The roller circulating tube 25 is a molded product of synthetic resin, and a roller return path 25 formed by a through hole having a substantially square cross section is provided at the center along the axis line. A groove 27 having an arc shape is formed in each of four inner walls of the roller return path 26 in order to reduce or save the tube thickness, and this groove 27 is also utilized as an oil sump. Furthermore, a through hole 28 penetrating the tube wall laterally is a hole for inserting a pin to hold a core used in forming the square through hole 26 during injection molding or the like.

On the peripheral surface of the circulating tube 25, there are formed with four fitting adjustment ridges 25A at equi-intervals along the circumference to extend axially in parallel to one another. By virtue of these ridges 25A, when the roller circulating tube 25 is fitted into the through hole 23, it is positioned accurately so that an inclination of the square inner walls coincides with an inclination angle of the roller raceway surface 13, and also the rotation of the roller circulating tube 25 is prohibited.

Furthermore, the roller circulating tube 25 is provided with two positioning protrusions 29 protruding axially from each of opposite ends.

Figure 7:
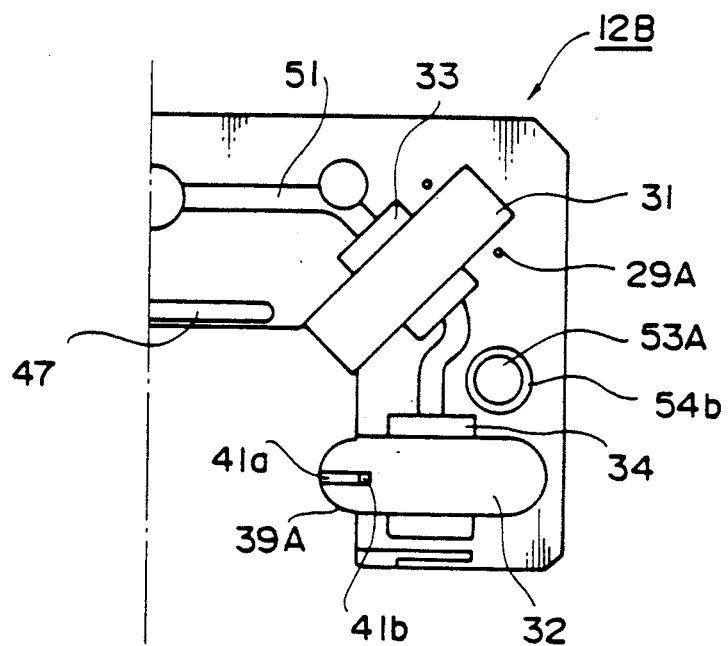
FIG. 7 is a rear view of a half of the end cap.
Figure 8:
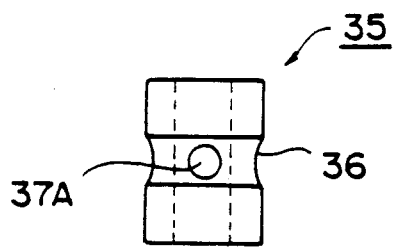
FIG. 8 is a front view of the return guide.
Figure 9:
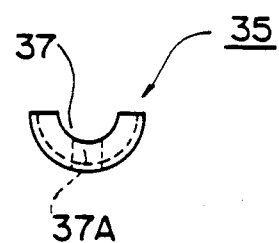
FIG. 9 is an upper view of the return guide of FIG. 8.

Each end cap 12B is an injection mold product of synthetic resin, and it has an inverted U-shape cross section as shown in FIG. 7 in which a half part is shown. In each half part (right or left) of a joining end surface of the end cap 12B, a semicircular recess 31 (a longitudinal cross section is semicircular) inclined at an angle of 45° and a horizontal semicircular recess 32 are formed in an upper and lower positional relation. Both the semicircular recesses 31 and 32 have half-cylindrical grooves 33 and 34 formed respectively traversing at longitudinal center portions. A half-hollow-cylindrical return guide 35 as shown in FIGS. 8 and 9 is fitted into each of the half-cylindrical grooves 33 and 34. A groove 36 having an arc-shaped cross section is formed in the peripheral surface of the return guide 35 at an longitudinal center along the circumference thereby to form a guide surface of the balls B. A recess 37 defined by the inner peripheral surface of the return guide 35 serves as a lubricant passage as will be described later. A through hole 37A passing from the recess 37 to the groove 36 in the outer peripheral surface is a oil feed hole.

Figure 10:
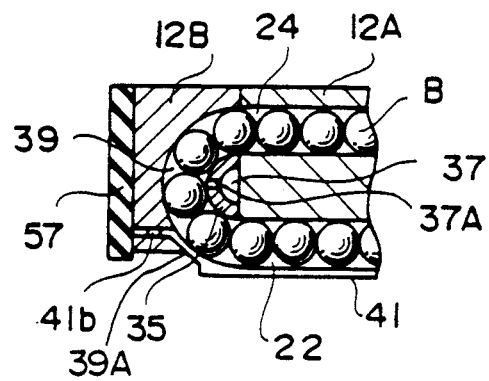
FIG. 10 is a partial sectional view taken along the line X—X in FIG. 2.

By the semicircular recess 31 formed in the end cap 12B with the inclination of 45° together with the return guide 35 assembled therein, a half-doughnut like curved path 38 having a square cross section is formed (a rear view is shown by dotted line in FIG. 1). This curved path 38 brings the roller rolling path 21 into communication with the roller return path 26. Also, by the horizontal semicircular recess 32 together with the return guide 35 assembled therein, a curved path 39 is formed as shown in FIG. 10. This curved path 39 brings the ball rolling path 22 into communication with the ball return path 24.

A ball infinitely circulating route is made up of the ball rolling path 22, the ball return path 24, and the curved path 39, and a multiplicity of the balls B are inserted therein rollably.

On the other hand, the roller rolling path 21, the roller return path 26, and the roller curved path 38 make up a roller infinitely circulating route, and a multiplicity of the rollers R are inserted therein rollably. An upper side edge between the outer peripheral surface and the upper end face of each roller R is chamfered to a great extent, and a chamfered slant surface R1 chamfered at an angle of 45° is formed.

Furthermore, in each end cap 12B, an inner end portion of the curved path 39 for guiding the balls B is protruded inwardly with a semicircular shape to form a ball scooping protrusion 39A. The tip end of the ball scooping protrusion 39A having an acute angle is located in the proximity of a groove bottom of the ball rolling groove 14 of the guide rail 11. The ball scooping protrusion 39A is formed with a fixing groove 41a and a fixing hole 41b for a ball retainer 41 which will be described later.

Furthermore, at positions near the recess 31 of the end cap 12B, there are provided with positioning holes 29A into which the positioning protrusions 29 of the roller circulating tube 25 are fitted.

Figure 11:
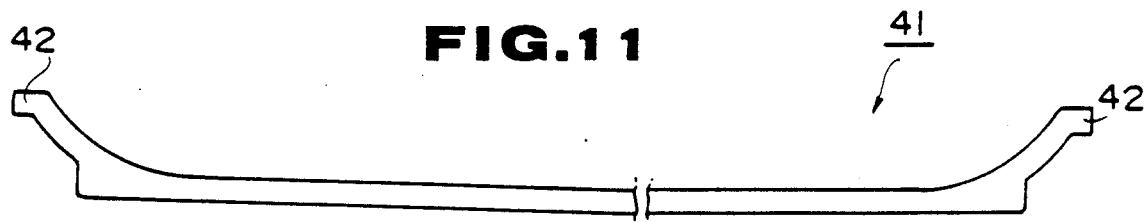
FIG. 11 is a plan view of the ball retainer.

As shown in FIG. 11, the ball retainer 41 is an elongate member having a square cross section. Opposite ends of the elongate ball retainer 41 are curved in an arc shape in order to guide the balls B smoothly, and fixing portions 42 are formed at extreme opposite ends. The mounting of the ball retainer 41 is achieved by inserting the fixing portions 42 into the retainer fixing holes 41b formed in the ball scooping protrusions 39A of the end caps 12B. In a condition, in which the slider 12 is assembled to the guide rail 11, each ball retainer 41 is accommodated in the retainer recess 16 of the guide rail 11, and any interference with the guide rail 11 is prevented.

Figure 12:
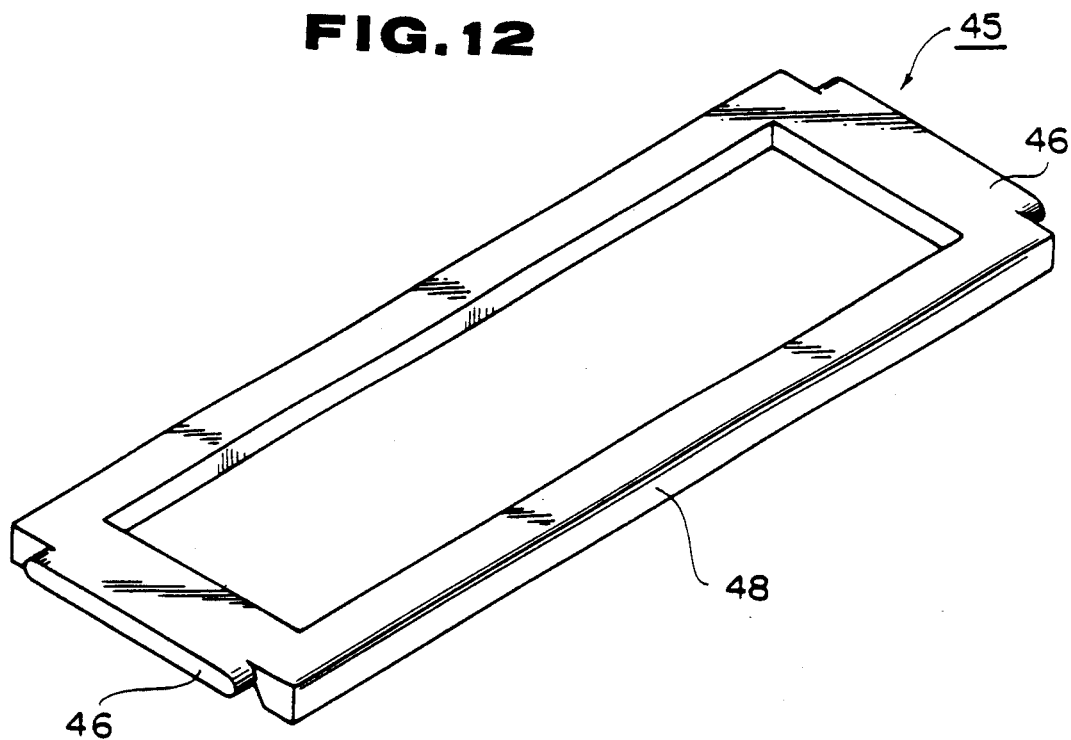
FIG. 12 is a perspective view of the roller retainer.
Figure 13:
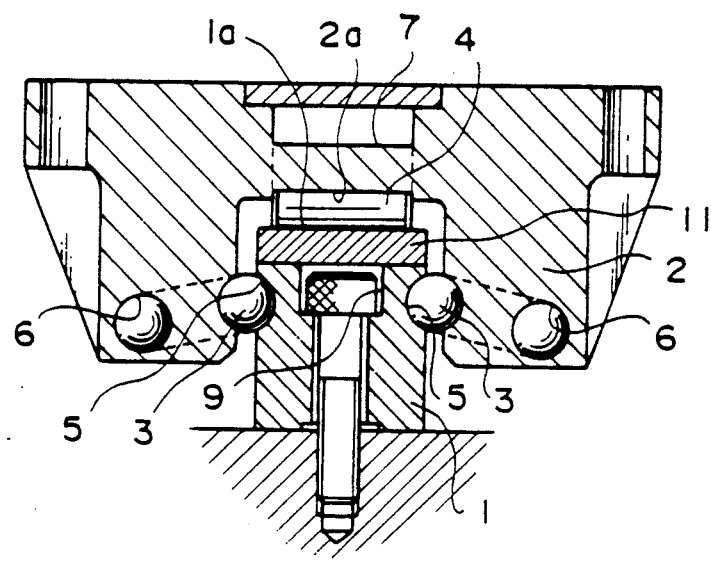
FIG. 13 is a longitudinal sectional view of a prior art linear guide apparatus using a combination of balls and rollers.

In contrast, as shown in FIG. 12, the roller retainer 45 which retains the rollers R within the roller rolling grooves 18 of the slider 12 is formed by injection molding a synthetic resin in a shape of a substantially rectangular frame.

The roller retainer 45 is mounted on the inner surface side of the slider main body 12A. For this purpose, holding and supporting sections 45 are provided on lateral legs at longitudinal or axial opposite ends of the roller retainer 45 protruding outwardly and axially. On the other hand, each end cap 12B is provided with a holding hole 47 formed in an end face which abuts against the end face of the slider main body 12A. In assembling the end cap 12B to the slider main body 12A, by fitting the protruded holding and supporting sections 46 of the roller retainer 45 into the supporting holes 47 of both the end caps 12B, the roller retainer 45 is supported by the end caps 12B so that the roller retainer 45 is accommodated in a space between the upper surface 11b of the guide rail 11 and the inner surface 12c of the slider main body 12A facing the upper surface 11b. Outer side surfaces of both longitudinal legs (right and left) of the rectangular frame-shaped roller retainer 45 serve as roller retaining surfaces 48. The roller retaining surface 48 abuts against the chamfered slant surfaces R1 of the rollers R within the roller rolling groove 18. Thus, the rollers R within the pair of roller rolling grooves 18 at right and left of the slider main body 12A are retained at the same time by the roller retainer 45.

In FIGS. 2 and 3, the reference numeral 50 designates an oil fitting mounted to the end cap 12B. A lubricant injected from this oil fitting 50 passes through an oil feed groove 51 formed in the joining end face of the end cap 12B, the recess 37 at the inner side of the return guide 35, and the oil feed hole 37A, and the lubricant is supplied into the semicircular recess 31 for the rollers and into the semicircular recess 32 for the balls.

The reference numeral 52 designates fixing screws of mounting the end cap 12B to the slider main body 12, and screw holes 53 are formed in the end face of the slider main body 12A.

Among the screw holes 53, those which are formed in the side walls 17 have an annular recess 54a formed about the screw hole concentrically. On the other hand, a screw inserting hole 53A formed in the end cap 12B penetrating axially at a position corresponding to the screw hole 53 has an annular projection 54b about the screw inserting hole 53A protruding from the joining end face of the end cap 12B. Accordingly, in assembling the end cap 12B to the end face of the slider main body 12A, the annular projection is fitted into the annular recess 54a to achieve the positioning.

Furthermore, the reference numeral 55 designates an inserting hole for a bolt to secure the guide rail 11 to a base or the like (not shown) when the linear guide apparatus is to be used, and numeral 58 designates a bolt hole for mounting a member to be driven such as a table or the like to the slider 12. Further, the numeral 57 designates a side seal attached to the end cap 12B to wipe the roller raceway 13 of the guide rail 11 and the ball rolling groove 14 thereby to prevent foreign matters from entering. Further, the numeral 56 designates an under seal attached to a lower surface of the slider 12.

Next, the operation of the above embodiment will be described.

Under a condition in which the slider 12 is removed from the guide rail 11, the balls B loaded within the ball rolling groove 19 of the slider main body 12A are retained by the ball retainer 41 which is supported by the end caps 12B by inserting the opposite ends 42 into the fixing holes 41b formed in both the end caps 12B.

On the other hand, the rollers R loaded within the roller rolling grooves 18 are retained by the roller retainer 45 which is mounted below the inner surface of the slider 12 by inserting the holding and supporting sections 46 at the opposite ends of the roller retainer 45 into the supporting holes 47 of both the end caps 12B. Specifically, under a condition in which the slider 12 is removed from the guide rail 11, the rollers R in the roller rolling grooves 18 depend therefrom. Then, the chamfered slant surfaces R1 of the rollers R abut against the roller retaining surface 48 of the roller retainer 45 and the rollers R are prevented from falling off.

When the slider 12 assembled to the guide rail 11 is moved in an axial direction, the rollers R loaded in the roller rolling grooves 18 move in the same direction as the slider 12 relative to the guide rail 11 while rolling on the inclined roller receway surfaces 13. At this time, an external load loaded on the slider 12 is transmitted to the guide rail 11 through inclined groove bottom surfaces 18a of the roller rolling grooves 18, the inclined rollers R, and the inclined roller raceway surfaces 13 regardless of whether the load is a vertical load or a lateral load. As a result, the linear guide apparatus can exhibit a sufficient rigidity against the loads other than the vertical load, and the balls B which are disposed at lateral positions are not subjected to undue forces.

The rollers R move with the movement of the slider 12, and which the rollers R reach one end of the roller rolling path 21, they make a U-turn. Subsequently, the rollers R pass through the roller return path 26 within the roller circulating tube 25 to reach the curved path 38 at the opposite side, and make a U-turn again to return to the roller rolling path 21 to repeat circulation while rolling on the roller raceway surface 13. In the above circulating operation, the groove 36 formed in the outer surface of the return guide 35 functions as a lubrication oil sump. Furthermore, the grooves 27 formed in the inner wall of the roller return path 26 for the purpose of reducing the thickness serve also as a lubrication oil sump.

On the other hand, the balls B within the ball rolling path 22 roll and move with the movement of the slider 12, and move in the same direction as the direction of movement of the slider 12 relative to the guide rail 11. At an end of the slider 12, the balls B change the direction by being led by the ball scooping protrusion 39A of the end cap 12B, and make a U-turn along the curved path 39. Subsequently, the balls B pass through the ball return path 24 of the slider main body 12A and reach the curved path 39 at the opposite side, and make a U-turn again to return to the ball rolling path 22 to repeat circulation while continuing rolling and movement.

In the travelling of the slider 12, since the roller retainer 45 is made from synthetic resin, the contact sound with the rollers R is very small. Also, since the roller retainer 45 has a self-lubricating property, the wear is seldom caused due to the contact with the rollers R, and a service life is long.

Moreover, since the roller retainer 45 can be mass produced by injection molding of synthetic resin, the roller retainer 45 can be provided at a low cost.

In the above embodiment, while the slant angle of the roller raceway surface 13 is described as being 45°, it is not limited to this angle and other angles may be used.

In the present invention, as described above, ball rolling grooves are formed in both lateral side surfaces of the guide rail, and the slider is supported by the balls which exhibit excellent performance against a lifting load. Further, the inclined rollers are disposed at upper corner portions of the guide rail so as to support a load of the slider acting downwardly. As a result, an advantage is provided in that it is possible to obtain a direct acting bearing which is compact with excellent performance, and which exhibits sufficient rigidity even when a load other than the vertical load is loaded. Furthermore, since it is designed to retain the balls by a ball retainer and to retain the rollers by a roller retainer, another advantage is offered in that there is no fear of the balls and the rollers fallen off even when the slider is removed from the guide rail, and the linear guide apparatus is easy to handle.

What is claimed is:

1. A linear guide apparatus using a combination of balls and rollers comprising:
    an axially extending guide rail having a pair of axial roller raceway surfaces respectively formed in boundary edges between an upper surface and both lateral side surfaces, the guide rail having a pair of axial ball rolling grooves respectively formed in both of the lateral side surfaces in parallel with the roller raceway surfaces;
    a slider main body movably straddling said guide rail in an axial direction and having a pair of roller rolling grooves formed in an inner surface respectively opposing the roller raceway surfaces, said slider main body having a pair of ball rolling grooves formed in the inner surface respectively opposing the ball rolling grooves of said guide rail, said slider main body further having ball return paths formed in a thick wall portion respectively in parallel with the ball rolling grooves and having roller return paths formed in a thick wall portion respectively in parallel with the roller rolling grooves;
    a pair of end caps respectively joined to opposite ends of said slider main body, each of said end caps having a first pair of curved paths, each communicating corresponding ones of the ball return path and the ball rolling groove with each other, and having a second pair of curved paths, each communicating corresponding ones of the roller return path and the roller rolling groove with each other;
    a plurality of balls rollably and circulatingly inserted in the opposing ball rolling grooves, the ball return paths, and the first curved paths;
    a plurality of rollers rollably and circulatingly inserted in the roller rolling grooves, the roller return paths, and the second curved paths; and
    a roller retainer having a rectangular frame shape for retaining the rollers in the roller rolling grooves of said slider main body, said roller retainer having roller retaining surfaces formed on outer side surfaces of longitudinal legs thereof and having holding and supporting sections protruding axially and outwardly from lateral legs thereof, said roller retainer being disposed in a space between the upper surface of said guide rail and an opposing inner surface of said slider main body by being held and supported by said end caps with the holding and supporting sections fitted into supporting holes respectively formed in said end caps so that said roller retainer retains the rollers in the roller rolling grooves with the roller retaining surfaces of the longitudinal legs abutting against chamfered surfaces of the rollers.

2. The linear guide apparatus using a combination of balls and rollers according to claim 1 wherein each of the roller return paths is formed by inserting a roller circulating tube having a square through hole along a center axis into an axially penetrating cylindrical hole formed in a thick wall portion of said slider main body.

3. The linear guide apparatus using a combination of balls and rollers according to claim 2 wherein the roller circulating tube has positioning protrusions formed at axial opposite ends, and said end caps are respectively formed with positioning holes to receive the positioning protrusions thereinto.

4. The linear guide apparatus using a combination of balls and rollers according to claim 2 wherein the roller circulating tube has an axially extending fitting adjustment ridge formed on an outer surface.

* * * * *